US012731295B2

(12) United States Patent
Lundell et al.

(10) Patent No.: US 12,731,295 B2
(45) Date of Patent: Sep. 8, 2026

(54) INDIVIDUALIZED IMAGE COMPRESSION

(71) Applicant: Microsoft Technology Licensing, LLC, Redmond, WA (US)

(72) Inventors: Benjamin Eliot Lundell, Seattle, WA (US); Jacob Elliott Hadnett-Hunter, Ely (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 230 days.

(21) Appl. No.: 18/421,884

(22) Filed: Jan. 24, 2024

(65) Prior Publication Data

US 2025/0238959 A1 Jul. 24, 2025

(51) Int. Cl.
*G06K 9/00* (2022.01)
*G06T 9/00* (2006.01)

(52) U.S. Cl.
CPC .................................... *G06T 9/00* (2013.01)

(58) Field of Classification Search
CPC ........ G06T 9/00; H04N 19/16; H04N 19/162; H04N 19/172; H04N 19/124; H04N 19/61; H04N 19/132; H04N 19/176; H04N 21/6587; H04N 19/146; H04N 21/2343; H04L 67/131; A63F 13/335; G06F 3/14
See application file for complete search history.

(56) References Cited

U.S. PATENT DOCUMENTS 6,212,302 B1 * 4/2001 Honsinger ................ G06T 9/00 382/232
2008/0240583 A1 * 10/2008 Jones ..................... H04N 19/15 375/E7.157
2015/0312595 A1 10/2015 Vanam et al.
2018/0262758 A1 9/2018 El-Ghoroury et al.
2019/0313098 A1 10/2019 Grois et al.
2020/0241823 A1 * 7/2020 Pohl ........................ G06F 3/013
2021/0235126 A1 7/2021 Reznik et al.
2023/0111900 A1 4/2023 Kim et al.

OTHER PUBLICATIONS

"Data Compression", Retrieved From: https://cs.stanford.edu/people/eroberts/courses/soco/projects/data-compression/lossy/jpeg/index.htm, Retrieved Date: Jun. 26, 2023, 1 Page.
"Emergent Techniques for Assessment of Visual Performance", In Publication of National Academies Press, 1985, 76 Pages.
"JPEG", Retrieved From: https://en.wikipedia.org/wiki/JPEG#Discrete_cosine_transform, Jul. 26, 2001, 35 Pages.
International Search Report and Written Opinion dated Feb. 12, 2025, from International Patent Application No. PCT/US2024/058169, 15 pp.

* cited by examiner

*Primary Examiner* — Gregory A Morse
*Assistant Examiner* — Owais I Memon
(74) *Attorney, Agent, or Firm* — Klarquist Sparkman, LLP

(57) ABSTRACT

Examples are disclosed relating to an approach for individualized image compression. In one example, an individual contrast sensitivity function (CSF) of a user is received from a remote computing system. A distance measurement indicating a distance between the user and a display of the remote computing system is received from the remote computing system. An image frame is generated. One or more parameters of a compression algorithm are modified based at least on the individual CSF of the user and the distance measurement. A compressed image frame is generated from the image frame using the compression algorithm based at least on the one or more modified parameters.

20 Claims, 9 Drawing Sheets

INDIVIDUALIZED IMAGE COMPRESSION

BACKGROUND

Streaming video (e.g., a sequence of image frames) rendered at one computing device and sent to another remote computing device for playback is often compressed to provide various benefits. For example, compression reduces the file size of the video, making it more efficient to transmit over the internet. As another example, the smaller file size of the compressed video results in faster loading times for playback. As yet another example, compressed video can be delivered more quickly to the viewer's device, reducing buffering and minimizing wait times. Transmitting less data also reduces the costs associated with streaming services. Both content providers and users benefit from lower data transfer costs, particularly in regions where data usage is metered or expensive. Moreover, compression allows streaming services to adapt to variable network conditions. Video quality can be adjusted dynamically based on available bandwidth, ensuring a continuous viewing experience even in situations where internet speeds fluctuate.

SUMMARY

Examples are disclosed relating to an approach for individualized image compression. In one example, an individual contrast sensitivity function (CSF) of a user is received from a remote computing system. A distance measurement indicating a distance between the user and a display of the remote computing system is received from the remote computing system. An image frame is generated. One or more parameters of a compression algorithm are modified based at least on the individual CSF of the user and the distance measurement. A compressed image frame is generated from the image frame using the compression algorithm based at least on the one or more modified parameters.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
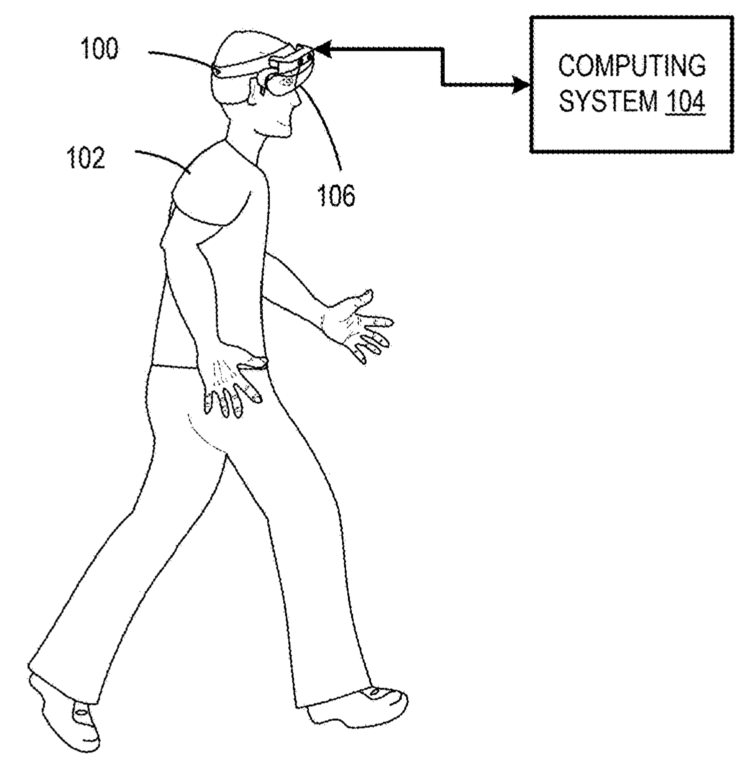
FIG. 1 shows an example scenario in which an augmented-reality computing device receives video that is compressed based at least on an individual contrast sensitivity function (CSF) of a user of the augmented-reality computing device.

Streaming video (e.g., a sequence of image frames) rendered at one computing device and sent to another remote computing device for playback can benefit from being compressed. For example, compression reduces the file size of the video, making it more efficient to transmit over the internet. Moreover, the smaller file size of the compressed video results in reduced buffering and faster loading times for playback, among other benefits. Existing image-compression algorithms (e.g., JPEG, HVEC, etc.) attempt to take the human visual system of a general population of users into account when performing image compression. The human visual system refers to the network of structures and processes that enable humans to perceive and interpret visual information from the surrounding environment. It involves the eyes, which capture visual stimuli, as well as the neural pathways and brain regions responsible for processing and interpreting that information. Visual systems differ from human to human. Existing image-compression algorithms often allocate more bits to preserve details in more visually-sensitive areas of an image (e.g., regions with high contrast or important image features) and fewer bits in less visually-sensitive areas of the image that cannot not be perceived by the general population of users due to the natural limitations of the human visual system. More particularly, parameters of existing image-compression algorithms are set to default values that benefit the average user of the general population. Despite this approach, existing image-compression algorithms still introduce artifacts that can degrade the quality of the viewing experience of compressed image frames and/or video for individual users having visual systems characteristics that skew away from that of the average user.

Accordingly, examples are disclosed relating to an approach for individualized image compression in which an image compression algorithm is specifically tuned to eliminate precise spatial frequencies within an image that a specific user is less likely or unable to perceive relative to other users. In one example, an individual contrast sensitivity function (CSF) of a user is received from a remote computing system. The individual CSF is a measure that quantifies the ability of the visual system of the specific user to distinguish between objects with varying levels of contrast at different sizes/distances or spatial frequencies. A distance measurement indicating a distance between the user and a display of the remote computing system is received from the remote computing system. An image frame is generated. One or more parameters of a compression algorithm are modified based at least on the individual CSF of the user and the distance measurement. A compressed image frame is generated using the compression algorithm based at least on the one or more modified parameters. The compressed image frame is sent to the remote computing system for display via the display of the remote computing system.

The technical feature of modifying the parameter(s) of the compression algorithm according to both the individual CSF of the specific user and the distance measurement, provides the technical benefit that resulting compressed image frames produced by the compression algorithm have a significantly reduced number of visual artifacts that can be perceived by the specific user relative to compressed image frames that are produced by a default compression algorithm having parameters that are tuned for a general population of users. Moreover, in some examples, depending on the individual CSF of the specific user, compressed image frames produced by the compression algorithm that is tuned for the specific user may have an increased compression ratio relative to compressed image frames that are produced by the default compression algorithm. Such technical benefits may be especially appreciated in streaming video applications in order to produce high-quality compressed imagery having reduced file size that is more efficient to transmit over the internet and allows for reduced buffering and faster loading times for playback.

Figure 2:
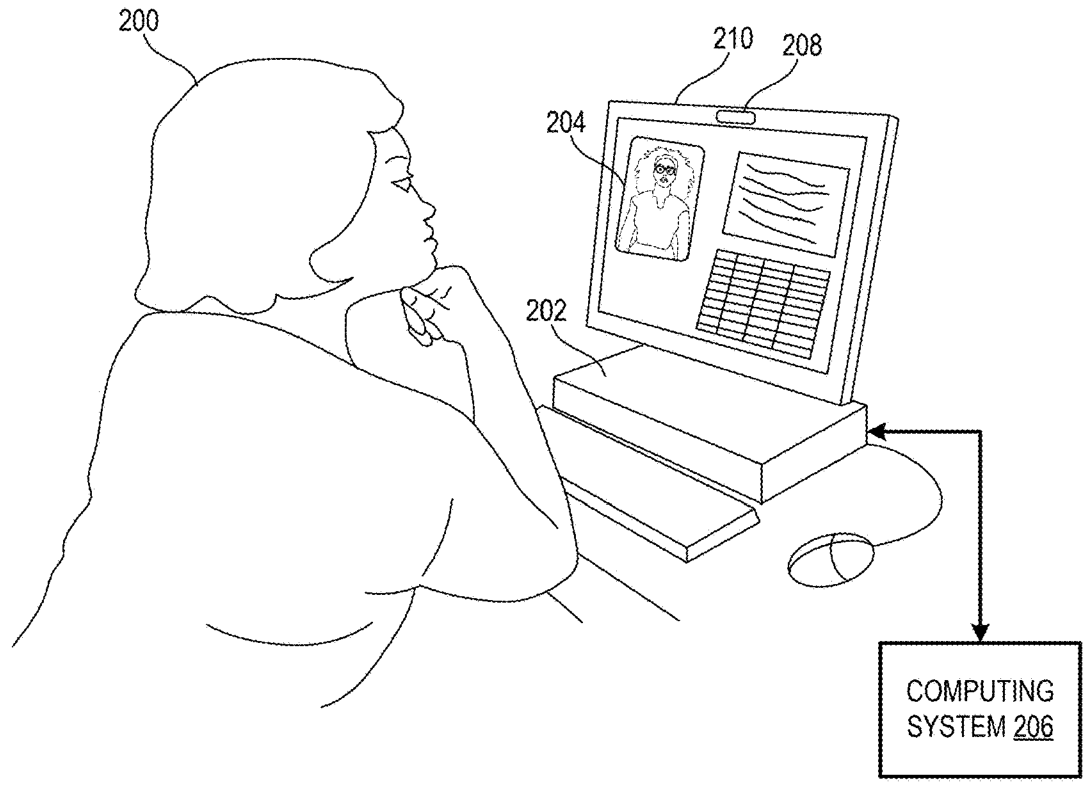
FIG. 2 shows another example scenario in which a desktop computer receives video that is compressed based at least on an individual CSF of a user of the desktop computer.

FIGS. 1-2 shows example scenarios in which different forms of computing systems receive compressed image frames that are generated based at least on an individual CSF of a user of the computing system.

FIG. 1 shows a computing system in the form of an augmented-reality computing device 100 worn by a user 102. The augmented-reality computing device 100 is configured to perform a user calibration process to calculate an individual CSF of the user 102. In one example, the user calibration process may include displaying a series of image frames of different grating patterns having different spatial frequencies (e.g., different numbers of dark and light lines having different widths) and different contrasts.

Figure 3:
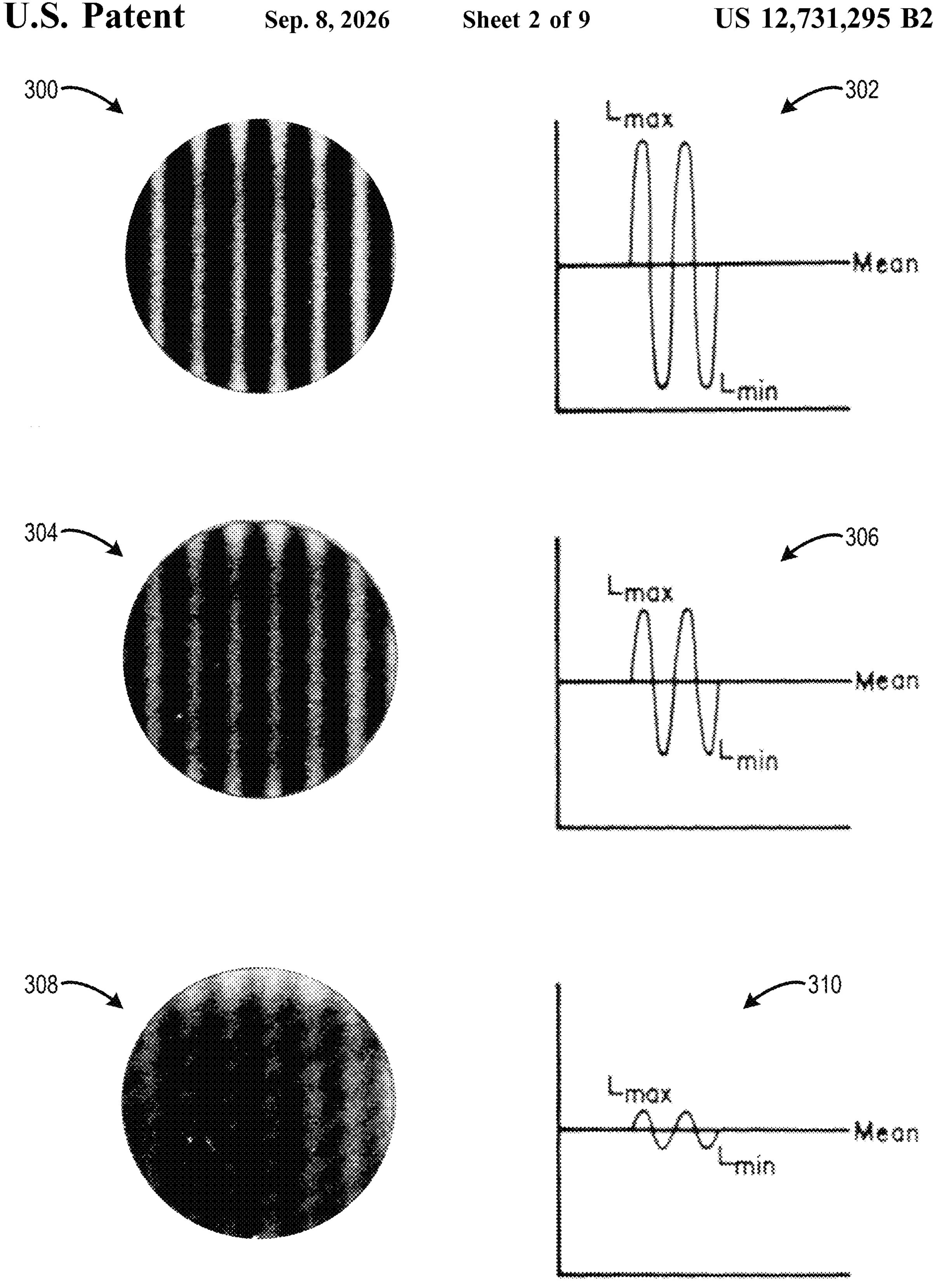
FIG. 3 shows different levels of contrast and associated spatial frequencies.

FIG. 3 shows an example grating pattern at a designated spatial frequency depicted at different contrast levels with associated luminance profiles. Contrast is a measure of the relative spread of the luminance of an image. In this example, the different contrast levels are defined by the equation:

$$C = \frac{L_{max} - L_{min}}{L_{mean}}$$

where C is the contrast, $L_{max}$ is the maximum luminance in the image, $L_{min}$ is the minimum luminance of the image, and $L_{mean}$ is the mean luminance of the image. A first instance 300 of the grating pattern has a relatively high contrast level as indicated by the amplitude of the associated luminance profile 302. A second instance 304 of the grating pattern has a medium contrast level as indicated by the amplitude of the associated luminance profile 306. A third instance 308 of the grating pattern has a relatively low contrast level as indicated by the amplitude of the associated luminance profile 310.

Returning to FIG. 1, upon being presented with different grating patterns (or other depictions of different spatial frequencies) at different contrast levels, the user 102 may indicate the minimum contrast required to perceive the pattern at each spatial frequency in order to determine the individual CSF of the user 102. The calibration process may include presenting any suitable number of patterns at any suitable number of different spatial frequencies in order to determine the individual CSF of the user 102. In other examples, the individual CSF of the user 102 may be determined according to a different calibration process.

Figure 4:
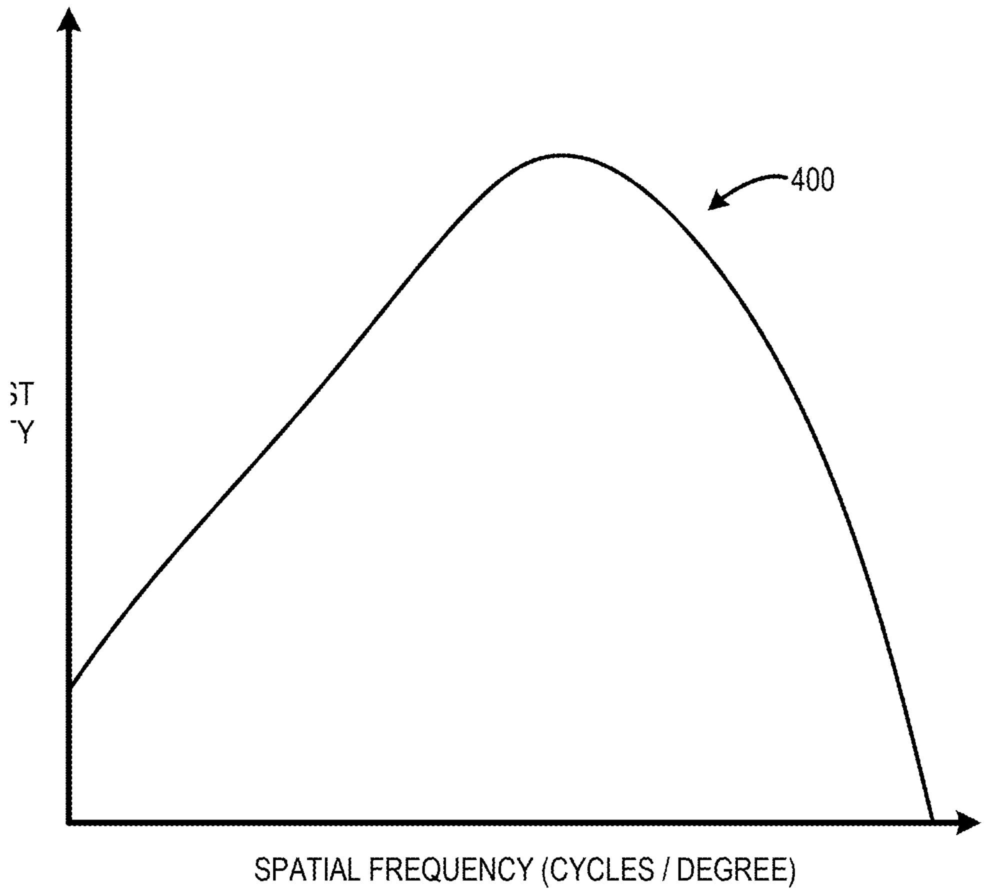
FIG. 4 shows an example individual CSF of a user.

FIG. 4 shows an example individual CSF 400 of a specific user. The individual CSF 400 indicates the specific user's contrast sensitivity at different spatial frequencies. Contrast sensitivity is a measure of the ability of the visual system of the specific user to distinguish between the subtle differences in luminance (brightness) or color of an image which is expressed in terms of the reciprocal of the threshold contrast. The threshold contrast is the minimum amount of contrast needed for the specific user to detect a visual stimulus (e.g., derived from the instances 300, 304, 308 of the grating pattern shown in FIG. 3). The individual CSF 400 of the user shows a peak at each specific spatial frequency, indicating the optimal sensitivity of the visual system of the specific user for that particular spatial frequency. The spatial frequency refers to the number of cycles of a pattern within a unit of space (e.g., cycles per degree of visual angle). In the individual CSF 400, higher values on the contrast sensitivity scale indicate better sensitivity to contrast at that particular spatial frequency and vice versa. The individual CSF 400 provides insights into how the visual system of the specific user responds to different levels of contrast at various spatial frequencies, helping to understand the sensitivity of the human visual system of the specific user across a range of visual stimuli.

Figure 5:
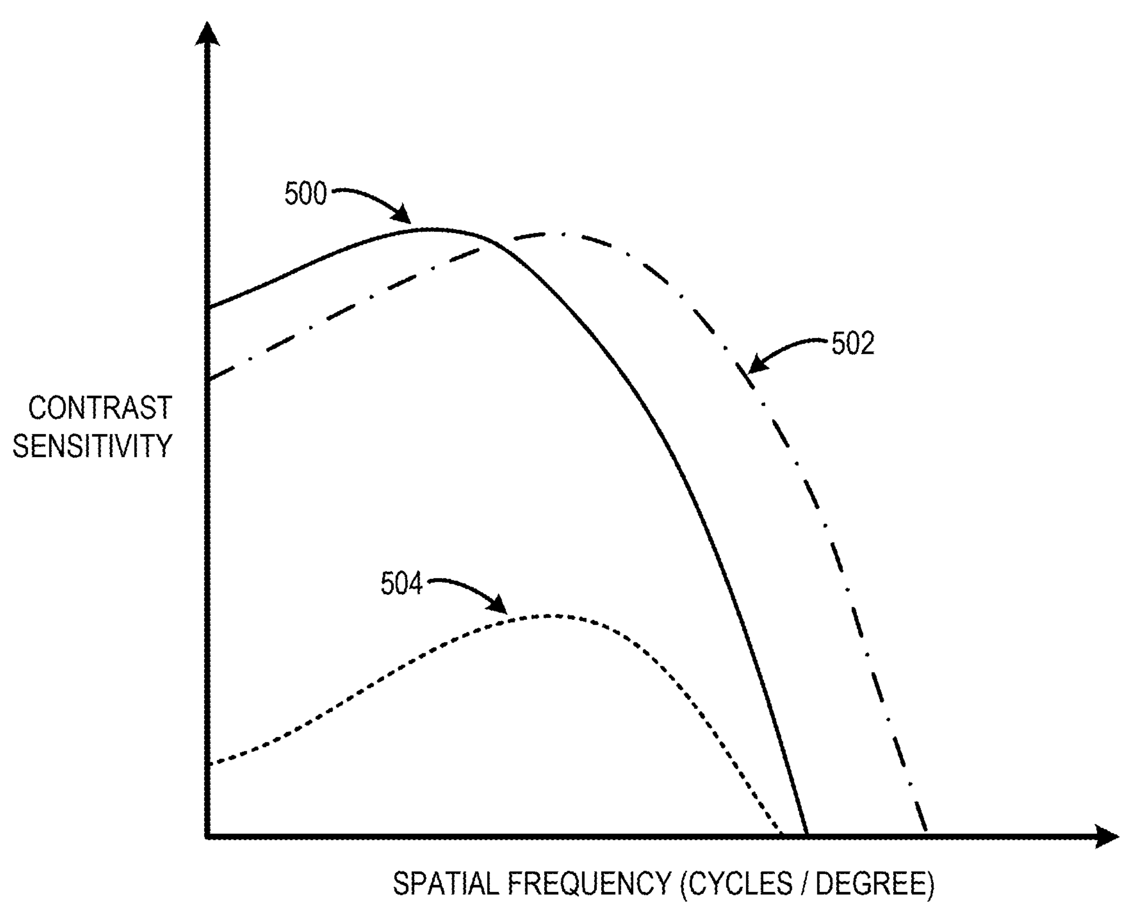
FIG. 5 shows different example individual CSFs of different users.

FIG. 5 different example individual CSFs of different users. A first individual CSF 500 corresponds to a first user. A second individual CSF 502 corresponds to a second user. A third individual CSF corresponds to a third user. Note that the first, second, and third users have different CSFs even though all of the users may have the save visual acuity. In the illustrated example, the third individual CSF 504 indicates that the third user has significantly lower contrast sensitivity than the first and second users. This would allow for image frames to be compressed more aggressively (e.g., resulting in smaller file size) across the range of spatial frequencies for the third user relative to image frames that are compressed for the first and second users. This is because the third user has lower contrast thresholds across the range of spatial frequencies, and thus would be unable to perceive artifacts in areas of the image frames having levels of contrast beyond the contrast thresholds at which the third user could perceive the artifacts. Additionally, in the illustrated example, individual compression based on the first individual CSF 500 of the first user would allow for more aggressive compression in higher spatial frequencies relative to individual compression based on the second individual CSF 502 of the second user. This is because the second user has greater contrast sensitivities in the higher spatial frequencies relative to the first user. Note that the illustrated CSFs are provided as examples, and an individual user may have any suitable CSF that can differ from other CSFs of other users.

Returning to FIG. 1, the augmented-reality computing device 100 sends the individual CSF of the specific user 102 to a computing system 104. For example, the computing system 104 may take the form of a server computer that is configured to generate compressed image frames and stream the compressed image frame to the augmented-reality computing device 100 for display on a near-eye display 106 of the augmented-reality computing device 100.

The computing system 104 uses the individual CSF of the user 102 to tune a compression algorithm to generate compressed image frames that are optimized for the visual system of the user 102. The individual CSF of the user 102 measures spatial frequency in cycles per degree. On the other hand, compression algorithms typically define spatial frequency in terms of cycles per pixel of a display for which a compressed image will be displayed on. In order to accurately perform individualized compression for a specific user, a distance measurement indicating a distance between the user 102, and more particularly, the eyes of the user 102, and the near-eye display 106 of the augmented-reality computing device 100 is needed to translate cycles per cycle degree to cycles per pixel. In this example, the distance between the user 102 and the near-eye display 106 is a fixed distance. So, the augmented-reality computing device 100 need only send the distance measurement to the computing system 104 once. For example, the augmented-reality computing device 100 can send the individual CSF of the user 102 and the distance measurement to the computing system 104 upon completion of the initial calibration process. The computing system 104 may store the individual CSF of the user 102 and the distance measurement in a user profile associated with the user 102, so that the information can be used for individualized image compression.

The computing system 104 generates image frames, such as augmented-reality image frames including virtual objects for display on the near-eye display 106 of the augmented-reality computing device 100. Further, the computing system 104 modifies one or more parameters of a compression algorithm based at least on the individual CSF of the user 102 and the distance measurement.

The parameters of the compression algorithm may be initially set to default values that are optimized for visual systems of a general population of users. The computing system 104 may modify parameters corresponding to spatial frequencies where the user 102 has lower contrast sensitivities relative to the general population of users as specified by the individual CSF to a greater degree than parameters corresponding to spatial frequencies where the user 102 has higher contrast sensitivities relative to the general population of users as specified by the individual CSF of the user.

The computing system 104 generates compressed image frames using the compression algorithm based at least on the one or more modified parameters and sends the compressed image frames to the augmented-reality computing device 100. For example, the compressed image frames can be sent as a compressed video stream to the augmented-reality computing device 100. The compressed image frames have a smaller file size relative to uncompressed image frames that allow for the compressed image frames to be transferred from the computing system 104 to the augmented-reality computing device 100 faster and/or while consuming less bandwidth relative to uncompressed image frames. The augmented-reality computing device 100 is configured to decompress compressed image frames received from the computing system 104 to generate uncompressed image frames in a format that is suitable for display via the near-eye display 106 of the augmented-reality computing device 100. The augmented-reality computing device 100 may use any suitable decompression algorithm to decompress the compressed image frames to generate uncompressed image frames in a format suitable for display via the near-eye display 106. Note that the compressed image frames can be embedded with metadata that indicates the modified parameters used to generate the compressed image frames, and the decompression algorithm can use the modified parameters in the metadata to decompress the compressed image frames to generate the uncompressed image frames.

Such individualized compression optimizes the compressed image frames to reduce a number of artifacts that can be perceived by the specific user 102 based at least one the individual CSF of the specific user 102 relative to compressed image frames that would be generated using default parameter values of the compression algorithm. Also, these compressed image frames may have a reduced file size relative to compressed image frames that would be generated using default parameter values of the compression algorithm, because regions of the compressed image frames having spatial frequencies that the user 102 is less sensitive to can be compressed more aggressively. The reduced file size of the compressed image frames allow for the compressed video stream to be sent to the augmented-reality computing device 100 faster, while also improving buffering/load times for the compressed video stream to be displayed on the near-eye display.

FIG. 2 shows another example scenario in which a computing system in the form of a desktop computer receives video that is compressed based at least on an individual CSF of a user of the desktop computer. In this scenario, a user 200 is interacting with a desktop computer 202, and more particularly with a video conferencing application program 204 executed by the desktop computer 202. The desktop computer 202 performs a user calibration process to calculate an individual CSF of the user 200 for individualized image compression. The user calibration process may be performed in a similar manner as described above with reference to FIG. 1. The desktop computer sends the individual CSF of the user 200 to a computing system 206.

Additionally, in this scenario, a position of the user 200 can dynamically change relative to the desktop computer 202 as the user 200 moves around, whereas the distance measurement for the augmented-reality computing device 100 of FIG. 1 was fixed. The desktop computer includes a camera 208 that captures images of the user 200. The desktop computer 202 determines a distance measurement indicating a distance between the user 200, and more particularly, the user's eyes and the desktop computer 202 based at least on the images of the user 200 captured by the camera 208. The desktop computer 202 sends the distance measurement to the computing system 206.

Further, since the user 200 can dynamically move relative to the desktop computer 202, the desktop computer 202 repeatedly determines updated distance measurements based at least on images captured by the camera 208 and sends the updated distance measurements to the remote computing system 206. The desktop computer 202 can perform the distance measurement according to any suitable refresh rate. In some examples, the refresh rate can correspond to a frame rate of image frames displayed by a display 210 of the desktop computer 202. In other examples, a different refresh rate may be employed depending on various factors, such connectivity and bandwidth parameters of the computer network connection between the desktop computer 202 and the computing system 206.

The computing system 206 uses the individual CSF of the user 200 and the distance measurement to tune a compression algorithm to generate compressed image frames that are optimized for the visual system of the user 200. The computing system 206 generates image frames, such as image frames of streaming video for the video conferencing application program 204. Further, the remote computing system 206 modifies one or more parameters of the compression algorithm based at least on the individual CSF of the user 200 and the distance measurement. Since the distance measurement changes, the computing system 206 dynamically modifies the parameters of the compression algorithm based at least on updated distance measurements as they are received from the desktop computer 202. In this way, the accuracy of individualized compression of image frames may be maintained even as the user 200 moves relative to the desktop computer 202. The computing system 206 generates compressed image frames using the compression algorithm based at least on the one or more modified parameters and sends the compressed image frames to the desktop computer 202. For example, the compressed image frames can be sent as a compressed video stream for the video conferencing application program 204. The desktop computer 202 is configured to decompress compressed image frames received from the computing system 206 to generate uncompressed image frames in a format that is suitable for display via the display 210. The desktop computer 202 may use any suitable decompression algorithm to decompress the compressed image frames to generate uncompressed image frames a format suitable for display via the display 210. Note that the compressed image frames can be embedded with metadata that indicates the modified parameters used to generate the compressed image frames, and the decompression algorithm can use the modified parameters in the metadata to decompress the compressed image frames to generate the uncompressed image frames.

FIGS. 1 and 2 show examples of different types computing systems that can benefit from individualized image compression. The individualized image compression approach disclosed herein is broadly applicable to any suitable type of computing system. In other examples, other types of computing systems may benefit from the individualized image compression approach, such as smartphones, smartwatches, tablet computers, wearable computing devices, smart televisions, and Internet of Things (IoT) computing devices, among others.

Figure 6:
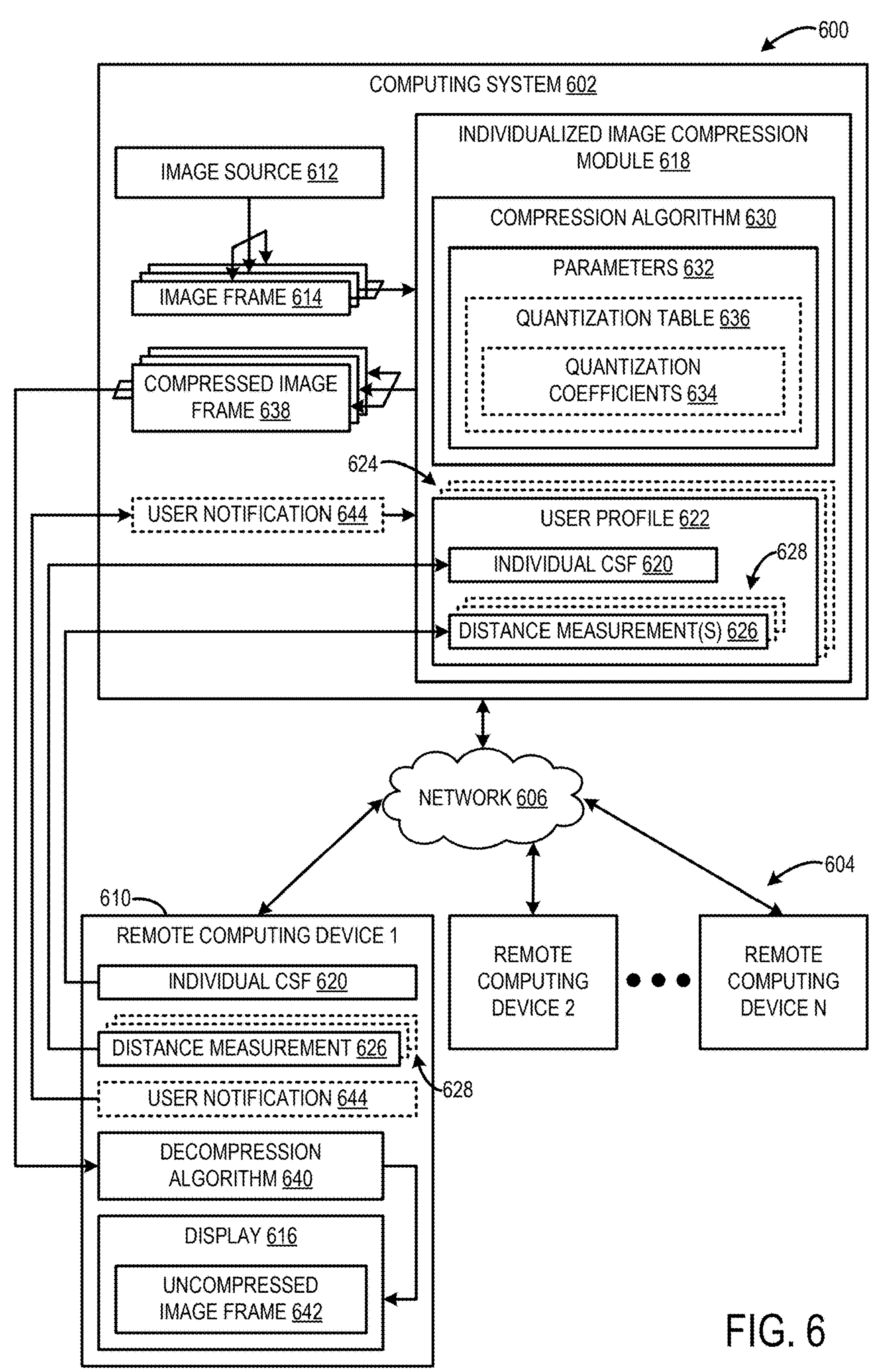
FIG. 6 shows an example computing environment in which individualized image compression is performed.

FIG. 6 shows an example computing environment 600 in which individualized image compression is performed. Note that blocks formed by dotted lines may indicate elements that are optional and may be omitted from the computing environment in some implementations. The computing environment 600 includes a computing system 602 in communication with a plurality of remote computing devices 604 via a computer network 606, such as the Internet. For example, the computing system 602 may correspond to the computing system 104 shown in FIG. 1 and the computing system 206 shown in FIG. 2, and the plurality of remote computing devices 604 may correspond to the augmented-reality computing device 100 shown in FIG. 1 and the desktop computer 202 shown in FIG. 2.

The computing system 602 is configured to perform individualized compression of image frames for the different remote computing devices 604 based at least on individual CSFs of users of the different remote computing devices 604. The individualized image compression process will be described with reference to a first remote computing device 608 of the plurality of remote computing devices 604. The computing system 602 is configured to perform individualized image compression for the other remote computing devices in a similar manner.

The computing system 602 includes an image source 612 configured to generate image frames 614 for display on a display 616 of the first remote computing device 610. The computing system 602 includes an individualized image compression module 618 that is configured to receive the image frames 614 output from the image source 612. The individualized image compression module 618 is configured to receive, from the first remote computing device 610, an individual CSF 620 of a user of the first remote computing device 610. For example, the first remote computing device 610 may be configured to perform a user calibration process to determine the individual CSF 620 of the user. The individualized image compression module 618 is configured to store the individual CSF 620 of the user in a user profile 622 associated with the user. The user profile 622 is one of a plurality of different user profiles 624 corresponding to different users.

The individualized image compression module 618 is configured to receive, from the first remote computing device 610, one or more distance measurements 626. As discussed above, depending on the type of remote computing device, a user may be a fixed distance away from a display of the remote computing device or the distance may change dynamically. In the case where the distance is fixed, the individualized image compression module 618 may receive a single distance measurement 626 from the first remote computing device 610. The individualized image compression module 618 is configured to store the distance measurement 626 in the user profile 622 associated with the user. In the case where the distance changes dynamically, the individualized image compression module 618 may repeatedly receive a plurality of updated distance measurements 628. The individualized image compression module 618 is configured to store the updated distance measurements 628 in the user profile 622 of the user as they are received from the first remote computing device 610.

The first remote computing device 610 may perform the distance measurement 626 according to any suitable refresh rate. In some examples, the refresh rate of the distance measurement may correspond to the frame rate of the display 616 of the first remote computing device 610. In other examples, the refresh rate of the distance measurement may be less than the frame rate of the display 616 (e.g., every $5^{th}$, $10^{th}$, $50^{th}$, $100^{th}$ frame). In some examples, the refresh rate of the distance measurement may depend on network conditions of the computer network 606 (e.g., bandwidth, or factors that affect data transfer speeds).

The individualized image compression module 618 is configured to use a compression algorithm 630 to compress the image frames 614. The individualized image compression module 618 is configured to modify one or more parameters 632 of the compression algorithm 630 based at least on the individual CSF 620 of the user and the distance measurement 626. In the case where the distance measurement is updated repeatedly, the individualized image compression module 618 may modify the parameters 632 of the compression algorithm 630 based at least on the most recent distance measurement 626 received from the first remote computing device 610.

In some implementations, as part of the compression process, the individualized image compression module 618 may be configured to divide each image frame 614 into a number of blocks (e.g., 8×8). The individualized image compression module 618 may be configured to perform a Discrete Cosine Transform (DCT) on each block to compute how much of each spatial frequency is present in that block which are represented by frequency coefficients.

Figure 7:
FIG. 7 shows a visual representation of an example matrix of direct cosine transform (DCT) coefficients used by an image compression algorithm of the present disclosure.
Figure 7:
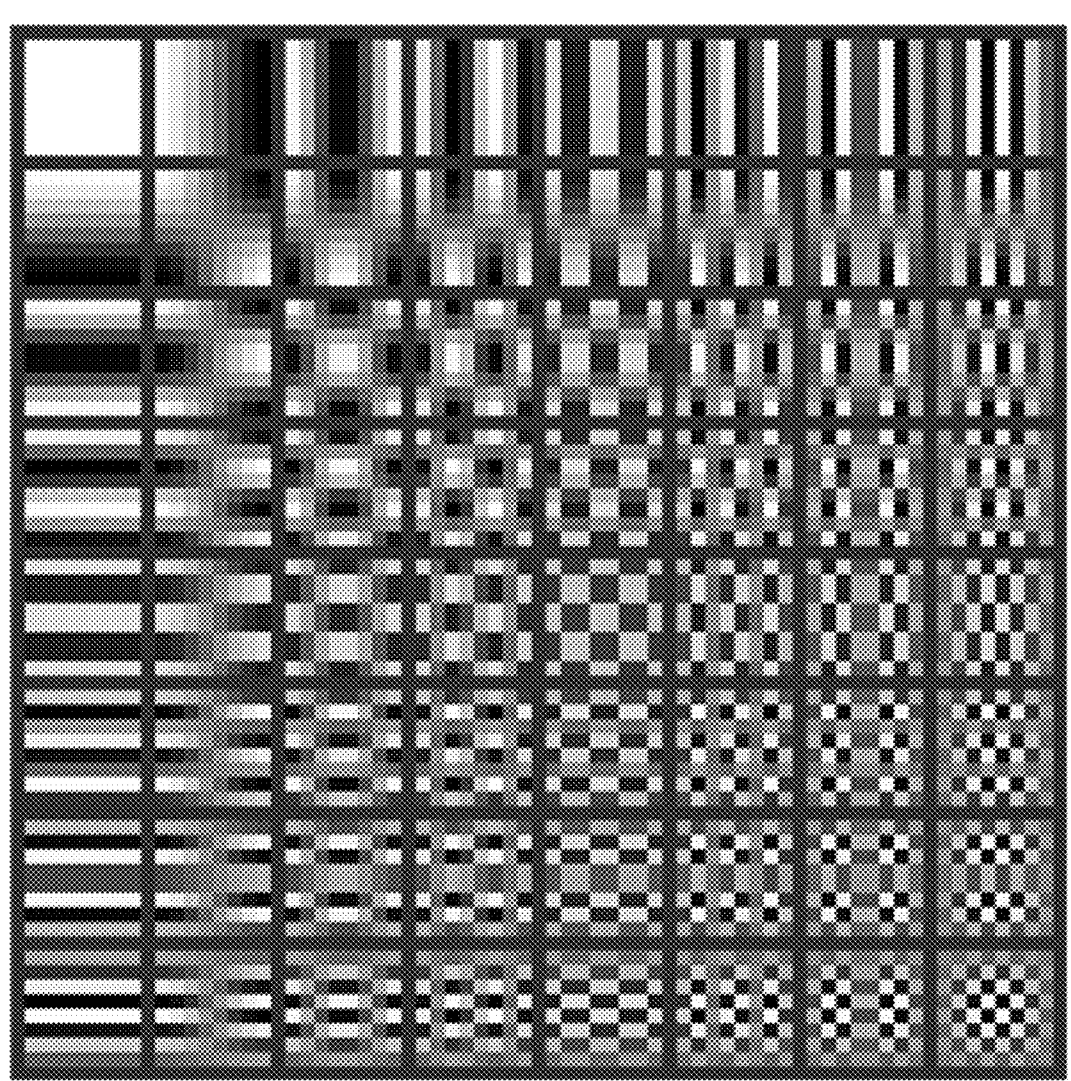

FIG. 7 shows a visual representation of an example matrix 700 of DCT coefficients. The matrix 700 is divided into 8×8 elements. Each element represents a different spatial frequency present in the element. In the illustrated example, the spatial frequency in the elements increases moving downward and rightward across the matrix 700, such that the element in the lower-right corner has the greatest spatial frequency in the matrix 700.

Returning to FIG. 6, the individualized image compression module 618 may be configured to quantize the frequency coefficients in the DCT matrix according to a quantization table 636, which is a lossy compression step. In particular, for every element position in the DCT matrix, a corresponding value in the quantization table 636 gives a quantum value indicating what the step size is going to be for that element. The coefficients that are most significant to the compressed rendition of the image (those closer to the upper left corner in the matrix 700 in FIG. 7) are encoded with a small step size, while coefficients that are less important (those closer to the lower right corner) are encoded with larger step sizes. The quantized coefficients 634 are suitable for standard (e.g., Entropy Encoding) lossless compression algorithms. Thus, in some implementations, the parameters 632 include quantized coefficients 634 of a quantization table 636.

The individualized image compression module 618 is configured to modify the quantized coefficients 634 based at least on the individual CSF 620 of the user and the distance measurement 626. In one example, the individualized image compression module 618 is configured to modify quantized coefficients 634 corresponding to spatial frequencies where the user has lower contrast sensitivities as specified by the individual CSF 620 of the user to a greater degree than quantized coefficients 634 corresponding to spatial frequencies where the user has higher contrast sensitivities as specified by the individual CSF 620 of the user. In other examples, the individualized image compression module 618 is configured to modify quantized coefficients 634 according to a different optimization scheme.

Note that the modified quantized coefficients 634 in the quantization table 636 are compatible with existing compression algorithms. Also, more generally, the individual CSF 620 can be mapped to various parameters of other existing compression algorithms. This allows for the individualized image compression approach of the present disclosure to be implemented with no need for new hardware or new codecs to be defined for the existing compression algorithms.

The individualized image compression module 618 is configured to compress the image frames 614 to generate compressed image frames 638 using the compression algorithm 630 based at least on the modified parameters 632. In some examples where the distance measurement is updated repeatedly, the parameters 632 may be modified on a frame-by-frame basis (or a slightly slower refresh rate that is imperceptible to the user), so that the compressed image frames 638 accurately reflect the current position of the user relative to the display 616. Further, the individualized image compression module 618 is configured to send the compressed image frames 638 to the first remote computing system 610. The first remote computing system 610 is configured to decompress the compressed image frames 638 using a decompression algorithm 640 to generate uncompressed images frames 642 in a format that is suitable for display via the display 616. The first remote computing system 610 may use any suitable decompression algorithm to decompress the compressed image frames 638 to generate the uncompressed image frames 642 in a format suitable for display via the display 616. Note that the compressed image frames can be embedded with metadata that indicates the modified parameters used to generate the compressed image frames, and the decompression algorithm can use the modified parameters in the metadata to decompress the compressed image frames to generate the uncompressed image frames.

In some implementations, the computer or computing system that generates the compressed image frames may be different than the computer or computing system that sends the compressed image frames to the first remote computing system 610.

In some implementations, multiple user may share use of the same remote computing device. The individualized image compression module 618 may be configured to receive a notification 644 from the first remote computing system 610 that a different user is using the first remote computing system 610. Based at least on receiving the notification 644, the individualized image compression module 618 may be configured to retrieve an individual CSF 620 from a user profile 622 of the different user. Further, the individualized image compression module 618 may be configured to modify the parameters 632 of the compression algorithm 630 based at least on the individual CSF 620 of the different user, generate compressed image frames 638 from the image frames 614 using the compression algorithm 630 based at least on the one or more modified parameters 632, and send the compressed image frames 638 to the first remote computing system 610 for display via the display 616. In this way, individualized image compression can be performed for different users of the same computing device.

Figure 8A:
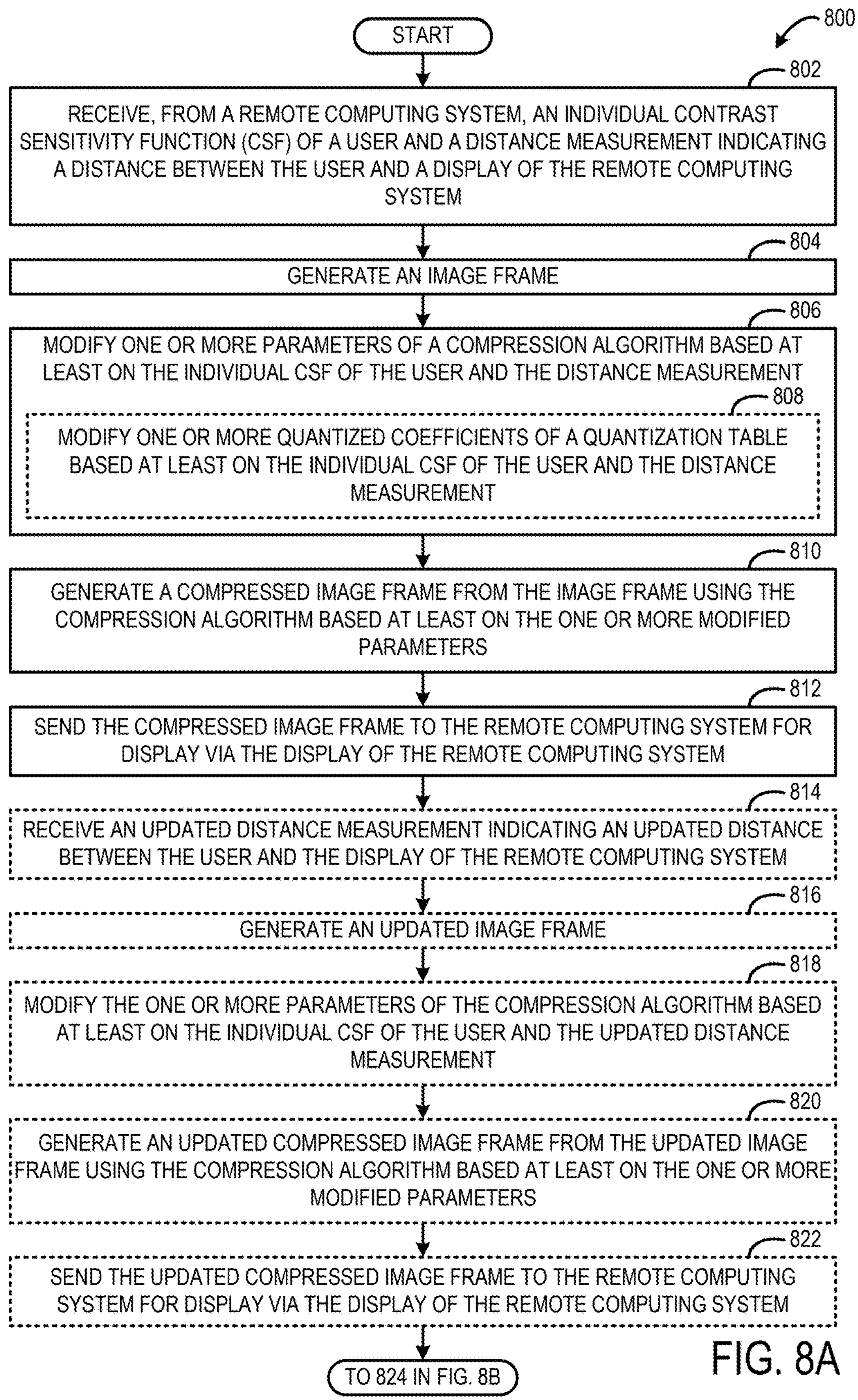
FIGS. 8A-8B show an example computer-implemented individualized image compression method.
Figure 8B:
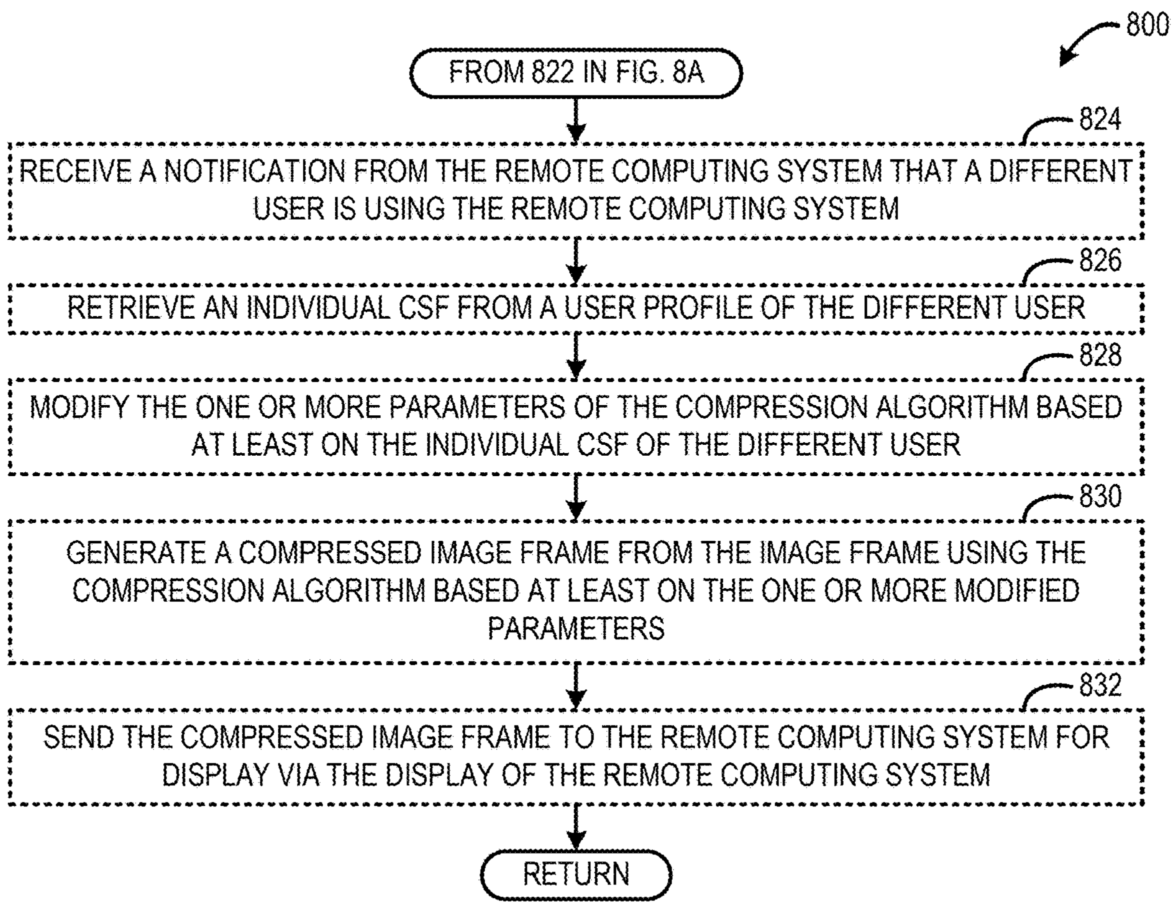

FIGS. 8A-8B show an example computer-implemented individualized image compression method 800. Note that steps indicated in dotted lines may be optional and omitted in some implementations. For example, the method 800 can be performed by the computing system 104 shown in FIG. 1, the computing system 206 shown in FIG. 2, the computing system 602 shown in FIG. 6, and the computing system 900 shown in FIG. 9, among other computing systems.

In FIG. 8A, at 802, the method 800 includes receiving, from a remote computing system, an individual contrast sensitivity function (CSF) of a user and a distance measurement indicating a distance between the user and a display of the remote computing system.

At 804, the method 800 includes generating an image frame.

At 806, the method 800 includes modifying one or more parameters of a compression algorithm based at least on the individual CSF of the user and the distance measurement. In some implementations where the parameters include quantized coefficients of a quantization table, at 808, the method 800 may include modifying one or more quantized coefficients of the quantization table based at least on the individual CSF of the user and the distance measurement.

At 810, the method 800 includes generating a compressed image frame from the image frame using the compression algorithm based at least on the one or more modified parameters.

At 812, the method 800 includes sending the compressed image frame to the remote computing system for display via the display of the remote computing system. Note that the remote computing system may decompress the compressed image frame, via a decompression algorithm, to generate an uncompressed image frame in a format that is suitable for display via the display of the remote computing system. The remote computing system may employ any suitable decompression algorithm to decompress the compressed image frame to generate the uncompressed image frame. Note that the compressed image frame can be embedded with metadata that indicates the modified parameters used to generate the compressed image frame, and the decompression algorithm can use the modified parameters in the metadata to decompress the compressed image frame to generate the uncompressed image frame. In some implementations, the computer or computing system that generates the compressed image frame may be different than the computer or computing system that sends the compressed image frame to the remote computing system. Note that the above steps may be repeated for a plurality of image frames to generate a compressed video stream of image frames for display via the display of the remote computing system.

In some implementations where the distance measurement is updated to reflect a change in position of the user relative to the display of the remote computing system, at 814, the method 800 may include receiving an updated distance measurement indicating an updated distance between the user and the display of the remote computing system. In some implementations, at 816, the method 800 may include generating an updated image frame. In some implementations, at 818, the method 800 may include modifying the one or more parameters of the compression algorithm based at least on the individual CSF of the user and the updated distance measurement. In some implementations, at 820, the method 800 may include generating an updated compressed image frame from the updated image frame using the compression algorithm based at least on the one or more modified parameters. In some implementations, at 822, the method 800 may include sending the updated compressed image frame to the remote computing system for display via the display of the remote computing system. Note that the remote computing system may uncompress the updated compressed image frame to a format that is suitable for display via the display of the remote computing system. In some implementations, the computer or computing system that generates the updated compressed image frame may be different than the computer or computing system that sends the updated compressed image frame to the remote computing system. Note that the above steps may be repeated for a plurality of image frames and corresponding updated distance measurement to generate a compressed video stream of image frames that accurately reflect changes in the position of the user relative to the display of the remote computing system.

In some implementations where multiple users share the same remote computing system, in FIG. 8B, at 824, the method 800 may include receiving a notification from the remote computing system that a different user is using the remote computing system. In some implementations, at 826, the method 800 may include retrieving an individual CSF from a user profile of the different user. In some implementations, at 828, the method 800 may include modifying the one or more parameters of the compression algorithm based at least on the individual CSF of the different user. In some implementations, at 830, the method 800 may include generating a compressed image frame from the image frame using the compression algorithm based at least on the one or more modified parameters. In some implementations, at 832, the method 800 may include sending the compressed image frame to the remote computing system for display via the display of the remote computing system. Note that the remote computing system may uncompress the compressed image frame to a format that is suitable for display via the display of the remote computing system. In some implementations, the computer or computing system that generates the compressed image frame may be different than the computer or computing system that sends the compressed image frame to the remote computing system.

The method 800 may be performed to compress image frames in a manner that is optimized for a specific user. In particular, by modifying the parameter(s) of the compression algorithm according to both the individual CSF of the specific user and the distance measurement, the resulting compressed image frames have a significantly reduced number of visual artifacts that can be perceived by the specific user relative to compressed image frames that are produced by a default compression algorithm having parameters that are tuned for a general population of users. Moreover, in some examples, depending on the individual CSF of the specific user, compressed image frames produced by the compression algorithm that is tuned for the specific user may have an increased compression ratio relative to compressed image frames that are produced by the default compression algorithm. Such technical benefits may be especially appreciated in streaming video applications in order to produce high-quality compressed imagery having reduced file size that is more efficient to transmit over the internet and allows for reduced buffering and faster loading times for playback.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 9:
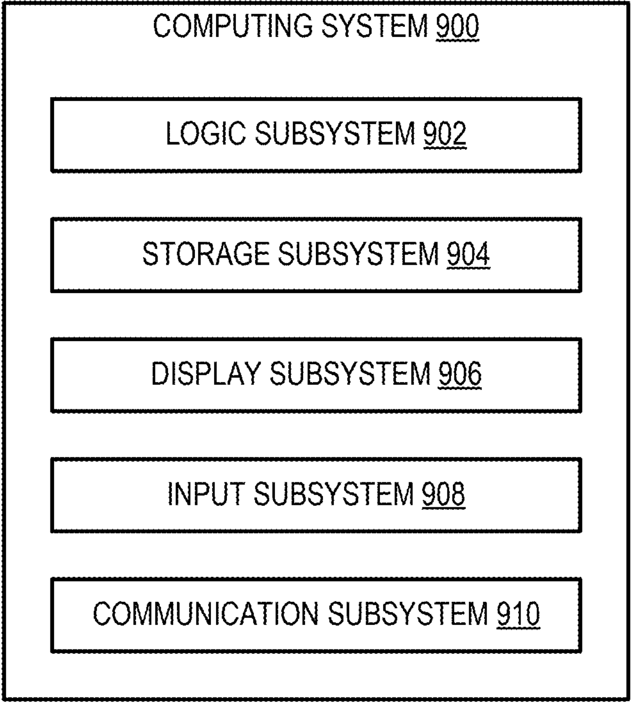
FIG. 9 shows an example computing system.

FIG. 9 schematically shows a simplified representation of a computing system 900 configured to provide any to all of the compute functionality described herein. For example, the computing system 900 may correspond to the augmented-reality computing device 100 and the computing system 104 shown in FIG. 1, the desktop computer 202 and the computing system 206 shown in FIG. 2, the computing system 602 and the plurality of remote computing devices 604 shown in FIG. 6. Computing system 900 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 900 includes a logic subsystem 902 and a storage subsystem 904. Computing system 900 may optionally include a display subsystem 906, input subsystem 908, communication subsystem 910, and/or other subsystems not shown in FIG. 9.

Logic subsystem 902 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 904 includes one or more physical devices configured to temporarily and/or permanently hold computer information such as data and instructions executable by the logic subsystem. When the storage subsystem includes two or more devices, the devices may be collocated and/or remotely located. Storage subsystem 904 may include volatile, nonvolatile, dynamic, static, read/write, read-only, random-access, sequential-access, location-addressable, file-addressable, and/or content-addressable devices. Storage subsystem 904 may include removable and/or built-in devices. When the logic subsystem executes instructions, the state of storage subsystem 904 may be transformed—e.g., to hold different data.

Aspects of logic subsystem 902 and storage subsystem 904 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

The term "module" may be used to describe an aspect of computing system 900 implemented to perform a particular function. In some cases, a module may be instantiated via logic machine 902 executing instructions held by storage subsystem 904. It will be understood that different modules may be instantiated from the same application, service, code block, object, library, routine, API, function, etc. Likewise, the same module may be instantiated by different applications, services, code blocks, objects, routines, APIs, functions, etc. The term "module" may encompass individual or groups of executable files, data files, libraries, drivers, scripts, database records, etc.

When included, display subsystem 906 may be used to present a visual representation of data held by storage subsystem 904. This visual representation may take the form of a graphical user interface (GUI). Display subsystem 906 may include one or more display devices utilizing virtually any type of technology. In some implementations, display subsystem may include one or more virtual-, augmented-, or mixed reality displays.

When included, input subsystem 908 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 910 may be configured to communicatively couple computing system 900 with one or more other computing devices. Communication subsystem 910 may include wired and/or wireless communication devices compatible with one or more different communication protocols. The communication subsystem may be configured for communication via personal-, local- and/or wide-area networks.

In an example, a computing system comprises a logic subsystem, and a storage subsystem holding instruction executable by the logic subsystem to receive, from a remote computing system, an individual contrast sensitivity function (CSF) of a user and a distance measurement indicating a distance between the user and a display of the remote computing system, generate an image frame, modify one or more parameters of a compression algorithm based at least on the individual CSF of the user and the distance measurement, and generate a compressed image frame from the image frame using the compression algorithm based at least on the one or more modified parameters. In this example and/or other examples, the one or more parameters of the compression algorithm may include one or more quantized coefficients of a quantization table used by the compression algorithm to generate the compressed image. In this example and/or other examples, the individual CSF of the user may indicate different contrast sensitivities of the user at different spatial frequencies, and quantized coefficients corresponding to spatial frequencies where the user has lower contrast sensitivities as specified by the individual CSF of the user may be modified to a greater degree than quantized coefficients corresponding to spatial frequencies where the user has higher contrast sensitivities as specified by the individual CSF of the user. In this example and/or other examples, the remote computing system may be configured to perform a user calibration process to calculate the individual CSF of the user. In this example and/or other examples, the distance between the user and the display of the remote computing system may be a fixed distance, the computing system may be configured to perform a user calibration process to calculate the distance measurement, and the computing system may receive the distance measurement from the remote computing system based at least on the remote computing system performing the user calibration process. In this example and/or other examples, the storage subsystem may hold instruction executable by the logic subsystem to receive an updated distance measurement indicating an updated distance between the user and the display of the remote computing system, generate an updated image frame, modify the one or more parameters of the compression algorithm based at least on the individual CSF of the user and the updated distance measurement, and generate an updated compressed image frame from the updated image frame using the compression algorithm based at least on the one or more modified parameters. In this example and/or other examples, the storage subsystem may hold instruction executable by the logic subsystem to generate a plurality of image frames, receive a plurality of updated distance measurements corresponding to the plurality of image frames from the remote computing system, for each of the plurality of image frames, modify the one or more parameters of the compression algorithm based at least on the individual CSF of the user and the updated distance measurement received for the corresponding image frame, and generate a compressed image frame from the image frame using the compression algorithm based at least on the one or more modified parameters. In this example and/or other examples, the individual CSF of the user may be associated with a user profile stored in the storage subsystem, the user profile may be one of a plurality of different user profiles corresponding to different users having different individual CSFs, and the storage subsystem may hold instruction executable by the logic subsystem to receive a notification from the remote computing system that a different user is using the remote computing system, retrieve an individual CSF from a user profile of the different user, modify the one or more parameters of the compression algorithm based at least on the individual CSF of the different user, and generate a compressed image frame from the image frame using the compression algorithm based at least on the one or more modified parameters. In this example and/or other examples, the remote computing system may include a camera configured to capture an image of the user, and the remote computing system may be configured to determine the distance measurement based at least on the image of the user captured by the camera. In this example and/or other examples, the remote computing system may be an augmented-reality computing system, the display may be a near-eye display of the augmented-reality computing system, and the compressed image frame may be a compressed augmented-reality image frame.

In another example, a computer-implemented individualized image compression method comprises receiving, from a remote computing system, an individual contrast sensitivity function (CSF) of a user and a distance measurement indicating a distance between the user and a display of the remote computing system, generating an image frame, modifying one or more parameters of a compression algorithm based at least on the individual CSF of the user and the distance measurement, and generating a compressed image frame from the image frame using the compression algorithm based at least on the one or more modified parameters. In this example and/or other examples, the one or more parameters of the compression algorithm may include one or more quantized coefficients of a quantization table used by the compression algorithm to generate the compressed image. In this example and/or other examples, the individual CSF of the user may indicate different contrast sensitivities of the user at different spatial frequencies, and quantized coefficients corresponding to spatial frequencies where the user has lower contrast sensitivities as specified by the individual CSF of the user may be modified to a greater degree than quantized coefficients corresponding to spatial frequencies where the user has higher contrast sensitivities as specified by the individual CSF of the user. In this example and/or other examples, the remote computing system may be configured to perform a user calibration process to calculate the individual CSF of the user. In this example and/or other examples, the distance between the user and the display of the remote computing system may be a fixed distance, the computing system may be configured to perform a user calibration process to calculate the distance measurement, and the computing system may receive the distance measurement from the remote computing system based at least on the remote computing system performing the user calibration process. In this example and/or other examples, the computer-implemented method may further comprise receiving an updated distance measurement indicating an updated distance between the user and the display of the remote computing system, generating an updated image frame, modifying the one or more parameters of the compression algorithm based at least on the individual CSF of the user and the updated distance measurement, and generating an updated compressed image frame from the updated image frame using the compression algorithm based at least on the one or more modified parameters. In this example and/or other examples, the computer-implemented method may further comprise generating a plurality of image frames, receiving a plurality of updated distance measurements corresponding to the plurality of image frames from the remote computing system, for each of the plurality of image frames, modifying the one or more parameters of the compression algorithm based at least on the individual CSF of the user and the updated distance measurement received for the corresponding image frame, and generating a compressed image frame from the image frame using the compression algorithm based at least on the one or more modified parameters. In this example and/or other examples, the individual CSF of the user may be associated with a user profile stored in a storage subsystem of a computing system, the user profile may be one of a plurality of different user profiles corresponding to different users having different individual CSFs, and the computer-implemented method may further comprise receiving a notification from the remote computing system that a different user is using the remote computing system, retrieving an individual CSF from a user profile of the different user, modifying the one or more parameters of the compression algorithm based at least on the individual CSF of the different user, and generating a compressed image frame from the image frame using the compression algorithm based at least on the one or more modified parameters. In this example and/or other examples, the remote computing system may be an augmented-reality computing system, the display may be a near-eye display of the augmented-reality computing system, and the compressed image frame may be a compressed augmented-reality image frame.

In yet another example, a computing system comprises a logic subsystem, and a storage subsystem holding instruction executable by the logic subsystem to receive, from a remote computing system, an individual contrast sensitivity function (CSF) of a user and a distance measurement indicating a distance between the user and a display of the remote computing system, generate an image frame, modify one or more quantized coefficients of a quantization table based at least on the individual CSF of the user and the distance measurement, and generate a compressed image frame from the image frame using the compression algorithm based at least on the one or more modified quantized coefficients of the quantization table.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:

a logic subsystem; and a storage subsystem holding instructions executable by the logic subsystem to:

receive, from a remote computing system, an individual contrast sensitivity function (CSF) of a user and a distance measurement indicating a distance between the user and a display of the remote computing system, wherein the individual CSF of the user indicates different contrast sensitivities of the user at different spatial frequencies;

generate an image frame;

modify one or more parameters of a compression algorithm based at least on the individual CSF of the user and the distance measurement, wherein the one or more parameters of the compression algorithm include values of a quantization table to be used by the compression algorithm to generate the compressed image, and wherein at least some of the values of the quantization table are modified to cause quantization of frequency coefficients at spatial frequencies where the user has lower contrast sensitivities, as specified by the individual CSF of the user, to a greater degree than frequency coefficients at spatial frequencies where the user has higher contrast sensitivities, as specified by the individual CSF of the user; and generate a compressed image frame from the image frame using the compression algorithm based at least on the one or more modified parameters.

2. The computing system of claim 1, wherein the remote computing system is configured to perform a user calibration process to calculate the individual CSF of the user.

3. The computing system of claim 1, wherein the distance between the user and the display of the remote computing system is a fixed distance, wherein the remote computing system is configured to perform a user calibration process to calculate the distance measurement, and wherein the computing system receives the distance measurement from the remote computing system based at least on the remote computing system performing the user calibration process.

4. The computing system of claim 1, wherein the storage subsystem further holds instructions executable by the logic subsystem to:

receive an updated distance measurement indicating an updated distance between the user and the display of the remote computing system, generate an updated image frame;

modify the one or more parameters of the compression algorithm based at least on the individual CSF of the user and the updated distance measurement; and generate an updated compressed image frame from the updated image frame using the compression algorithm based at least on the one or more modified parameters for the updated distance measurement.

5. The computing system of claim 1, wherein the storage subsystem further holds instructions executable by the logic subsystem to:

generate a plurality of image frames;

receive a plurality of updated distance measurements corresponding to the plurality of image frames from the remote computing system; and for each given image frame of the plurality of image frames, modify the one or more parameters of the compression algorithm based at least on the individual CSF of the user and the updated distance measurement received for the given image frame; and generate a compressed image frame from the given image frame using the compression algorithm based at least on the one or more modified parameters for the updated distance measurement received for the given image frame.

6. The computing system of claim 1, wherein the individual CSF of the user is associated with a user profile stored in the storage subsystem, wherein the user profile is one of a plurality of different user profiles corresponding to different users having different individual CSFs, and wherein the storage subsystem further holds instructions executable by the logic subsystem to:

receive a notification from the remote computing system that a different user is using the remote computing system;

retrieve an individual CSF of the different user from a user profile of the different user;

modify the one or more parameters of the compression algorithm based at least on the individual CSF of the different user; and generate another compressed image frame from another image frame using the compression algorithm based at least on the one or more modified parameters for the individual CSF of the different user.

7. The computing system of claim 1, wherein the remote computing system includes a camera configured to capture an image of the user, and wherein the remote computing system is configured to determine the distance measurement based at least on the image of the user captured by the camera.

8. The computing system of claim 1, wherein the remote computing system is an augmented-reality computing system, wherein the display is a near-eye display of the augmented-reality computing system, and wherein the compressed image frame is a compressed augmented-reality image frame.

9. A computer-implemented individualized image compression method, comprising:

receiving, from a remote computing system, an individual contrast sensitivity function (CSF) of a user and a distance measurement indicating a distance between the user and a display of the remote computing system, wherein the individual CSF of the user is associated with a user profile stored in a storage subsystem, and wherein the user profile is one of a plurality of different user profiles corresponding to different users having different individual CSFs;

generating an image frame;

modifying one or more parameters of a compression algorithm based at least on the individual CSF of the user and the distance measurement;

generating a compressed image frame from the image frame using the compression algorithm based at least on the one or more modified parameters;

receiving a notification from the remote computing system that a different user is using the remote computing system;

retrieving an individual CSF of the different user from a user profile of the different user;

modifying the one or more parameters of the compression algorithm based at least on the individual CSF of the different user; and generating another compressed image frame from another image frame using the compression algorithm based at least on the one or more modified parameters for the individual CSF of the different user.

10. The computer-implemented method of claim 9, wherein the one or more parameters of the compression algorithm include values of a quantization table to be used by the compression algorithm to generate the compressed image.

11. The computer-implemented method of claim 10, wherein the individual CSF of the user indicates different contrast sensitivities of the user at different spatial frequencies, and wherein at least some of the values of the quantization table are modified to cause quantization of frequency coefficients at spatial frequencies where the user has lower contrast sensitivities, as specified by the individual CSF of the user, to a greater degree than frequency coefficients at spatial frequencies where the user has higher contrast sensitivities, as specified by the individual CSF of the user.

12. The computer-implemented method of claim 9, wherein the remote computing system is configured to perform a user calibration process to calculate the individual CSF of the user.

13. The computer-implemented method of claim 9, wherein the distance between the user and the display of the remote computing system is a fixed distance, wherein the remote computing system is configured to perform a user calibration process to calculate the distance measurement, and wherein the computing system receives the distance measurement from the remote computing system based at least on the remote computing system performing the user calibration process.

14. The computer-implemented method of claim 9, further comprising:

receiving an updated distance measurement indicating an updated distance between the user and the display of the remote computing system;

generating an updated image frame;

modifying the one or more parameters of the compression algorithm based at least on the individual CSF of the user and the updated distance measurement; and generating an updated compressed image frame from the updated image frame using the compression algorithm based at least on the one or more modified parameters for the updated distance measurement.

15. The computer-implemented method of claim 9, further comprising:

generating a plurality of image frames;

receiving a plurality of updated distance measurements corresponding to the plurality of image frames from the remote computing system; and for each given image frame of the plurality of image frames, modifying the one or more parameters of the compression algorithm based at least on the individual CSF of the user and the updated distance measurement received for the given image frame; and generating a compressed image frame from the given image frame using the compression algorithm based at least on the one or more modified parameters for the updated distance measurement received for the given image frame.

16. The computer-implemented method of claim 9, wherein the remote computing system is an augmented-reality computing system, wherein the display is a near-eye display of the augmented-reality computing system, and wherein the compressed image frame is a compressed augmented-reality image frame.

17. A computing system comprising:

a logic subsystem; and a storage subsystem holding instructions executable by the logic subsystem to:

receive, from a remote computing system, an individual contrast sensitivity function (CSF) of a user and a distance measurement indicating a distance between the user and a display of the remote computing system, wherein the remote computing system includes a camera configured to capture an image of the user, and wherein the remote computing system is configured to determine the distance measurement based at least on the image of the user captured by the camera;

generate an image frame;

modify one or more values of a quantization table based at least on the individual CSF of the user and the distance measurement; and generate a compressed image frame from the image frame using a compression algorithm based at least on the one or more modified values of the quantization table.

18. The computing system of claim 17, wherein the individual CSF of the user indicates different contrast sensitivities of the user at different spatial frequencies, and wherein at least some of the values of the quantization table are modified to cause quantization of frequency coefficients at spatial frequencies where the user has lower contrast sensitivities, as specified by the individual CSF of the user, to a greater degree than frequency coefficients at spatial frequencies where the user has higher contrast sensitivities, as specified by the individual CSF of the user.

19. The computing system of claim 17, wherein the storage subsystem further holds instructions executable by the logic subsystem to:

generate a plurality of image frames;

receive a plurality of updated distance measurements corresponding to the plurality of image frames from the remote computing system; and for each given image frame of the plurality of image frames, modify the one or more parameters of the compression algorithm based at least on the individual CSF of the user and the updated distance measurement received for the given image frame; and generate a compressed image frame from the given image frame using the compression algorithm based at least on the one or more modified parameters for the updated distance measurement received for the given image frame.

20. The computing system of claim 17, wherein the individual CSF of the user is associated with a user profile stored in a storage subsystem, and wherein the user profile is one of a plurality of different user profiles corresponding to different users having different individual CSFs, and wherein the storage subsystem further holds instructions executable by the logic subsystem to:

receive a notification from the remote computing system that a different user is using the remote computing system;

retrieve an individual CSF of the different user from a user profile of the different user;

modify the one or more values of the quantization table based at least on the individual CSF of the different user; and generate another compressed image frame from another image frame using the compression algorithm based at least on the one or more modified values for the individual CSF of the different user.

* * * * *